US011347189B1

(12) United States Patent
Herrera et al.

(10) Patent No.: US 11,347,189 B1
(45) Date of Patent: May 31, 2022

(54) WATCH HAVING A CAMERA (71) Applicant: Apple Inc., Cupertino, CA (US)

(72) Inventors: Antonio F. Herrera, Palo Alto, CA (US); Tyler S. Bushnell, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 510 days.

(21) Appl. No.: 16/368,613

(22) Filed: Mar. 28, 2019

Related U.S. Application Data (60) Provisional application No. 62/733,012, filed on Sep. 18, 2018.

(51) Int. Cl.
| | |
|---|---|
| *G04G 21/02* | (2010.01) |
| *H04N 5/225* | (2006.01) |
| *G06F 3/0362* | (2013.01) |
| *H04N 5/232* | (2006.01) |

(52) U.S. Cl.
CPC ......... *G04G 21/025* (2013.01); *G06F 3/0362* (2013.01); *H04N 5/2253* (2013.01); *H04N 5/2254* (2013.01); *H04N 5/2256* (2013.01); *H04N 5/2257* (2013.01); *H04N 5/232411* (2018.08)

(58) Field of Classification Search
USPC .......................................................... 368/10
See application file for complete search history.

(56) References Cited

U.S. PATENT DOCUMENTS

| | | | | |
|---|---|---|---|---|
| 6,619,835 | B2 * | 9/2003 | Kita ..................... | A44C 5/0015 368/281 |
| 8,467,133 | B2 * | 6/2013 | Miller ..................... | G06F 3/005 359/630 |
| 9,285,589 | B2 * | 3/2016 | Osterhout ............... | G06F 3/005 |
| 9,642,538 | B2 * | 5/2017 | Newberry ............. | A61B 5/0002 |
| 2014/0098018 | A1 * | 4/2014 | Kim ........................ | G06F 3/014 345/156 |
| 2015/0157220 | A1 * | 6/2015 | Fish .................... | A61B 5/14552 600/301 |
| 2016/0344918 | A1 * | 11/2016 | Tao ..................... | H04N 5/23206 |
| 2017/0212999 | A1 * | 7/2017 | Wang .................... | A61B 5/1102 |

* cited by examiner

*Primary Examiner* — Clayton E. LaBalle
*Assistant Examiner* — Warren K Fenwick
(74) *Attorney, Agent, or Firm* — BakerHostetler (57) ABSTRACT

A watch having a camera is disclosed. The watch can include a housing having a front side, a back side, and an attachment interface configured to couple to a watch band. A camera can be mounted to the housing and configured to capture a picture of a scene through the back side of the housing. A display can be visible through the front side of the housing and configured to display the picture.

20 Claims, 7 Drawing Sheets

FIG. 15

WATCH HAVING A CAMERA

CROSS-REFERENCE TO RELATED APPLICATIONS

This application claims the benefit of U.S. Provisional Application No. 62/733,012, entitled "WATCH HAVING A CAMERA," filed Sep. 18, 2018, the entirety of which is incorporated herein by reference.

TECHNICAL FIELD

The present description relates generally to electronic wearable devices, and more particularly, to a watch having a camera.

BACKGROUND

Wearable electronic devices, such as watches, fitness trackers, and other wrist-worn devices, can be attractive choices for users due to their portability, aesthetic appeal, or potential to provide new functionalities over traditional electronic products. Typically, wearable electronic devices include internal electronics, such as one or more processors, housed within an assembly containing one or more input/output (I/O) devices that interface externally with the user, such as a display, a sensor, or the like. However, it remains a significant challenge to integrate many I/O devices within the practical constraints of a wearable device package, which may be small in size or designed for aesthetic appeal and wearable functionality.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The following disclosure relates to a watch having a camera. According to some embodiments, a watch can include a rotatable dial, such as a rotatable crown used for digital inputs. A camera can be included in the assembly to allow for images to be captured through an aperture extending through the dial. A lens can be integrated within the aperture and/or behind the aperture of the dial to focus an image of a scene. An image sensor disposed behind the aperture can further be configured to detect movement of a marking on the dial to allow the image sensor to function both as a camera for capturing pictures of a scene, and as a sensor that detects rotation of the dial for sensing rotational inputs. Accordingly, a camera can be integrated in a relatively compact watch housing package, and the multi-purposed functionality of the camera image sensor can avoid a need for a separate sensing component on the dial.

Additionally or alternatively, according to some embodiments a camera can be implemented as a back-facing camera configured capture pictures through a back side of a watch housing. Although the wrist may occlude the camera from taking pictures of a scene when the watch housing is worn on the wrist, the housing may be removable from the wrist via a release mechanism in the attachment interface, or by removing the housing together with the watch band, to capture pictures with the back-facing camera. A display presented through a front side of the housing can be used to display pictures captured with the camera concurrently to help guide the user in the picture taking task, while the back-facing camera may provide a convenient location for assembling a camera in what may be an otherwise small and compact watch housing assembly. Additionally or alternatively, the back-facing camera may permit components associated with the camera operation such as an image sensor and/or a camera flash to be multi-purposed for optical heart rate monitoring or other physiological sensing applications when the watch is worn on the wrist. Accordingly, a convenient and compact watch assembly having multiple functions may be achieved.

These and other embodiments are discussed below with reference to FIGS. 1-15. However, those skilled in the art will readily appreciate that the detailed description given herein with respect to these Figures is for explanatory purposes only and should not be construed as limiting.

Figure 1:
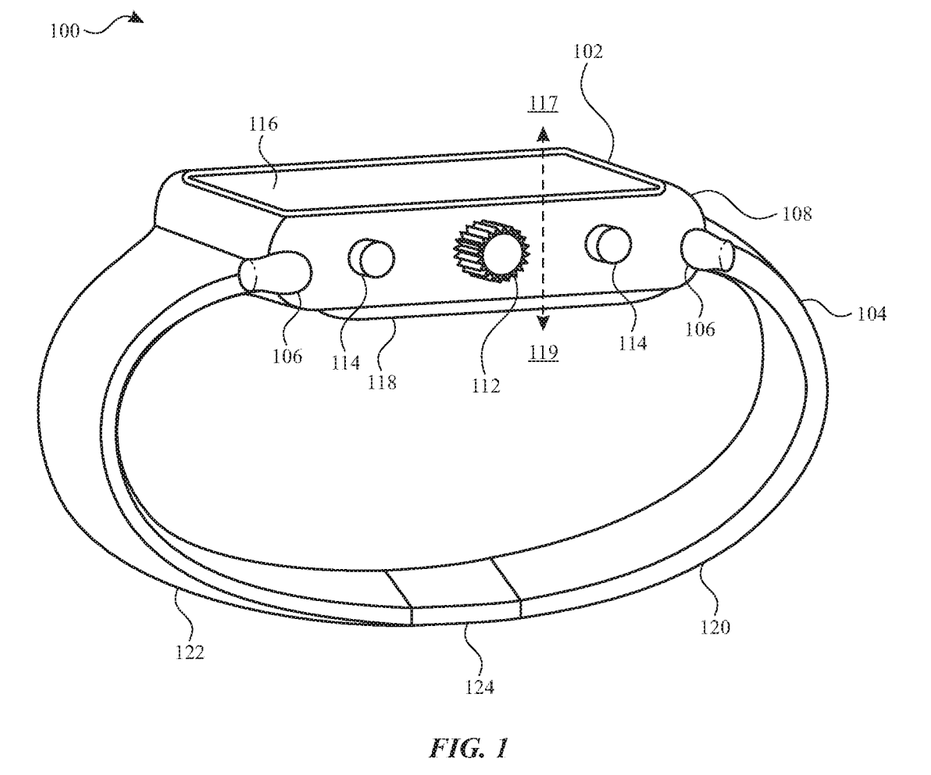
FIG. 1 is a perspective view of a watch, in accordance with some embodiments.

FIG. 1 is a perspective view of an example of an electronic device 100, such as a watch. While embodiments discussed herein are described with reference to a watch, it will be appreciated that the teachings relating to a watch can be applied to other electronic devices, including other wearable and/or portable computing devices. Examples include cell phones, smart phones, tablet computers, laptop computers, timekeeping devices, computerized glasses, headphones, head mounted displays, wearable navigation devices, sports devices, accessory devices, health-monitoring devices, medical devices, electronic bracelets and other jewelry. Hereinafter device 100 will be referred to as watch 100.

The watch 100 shown in FIG. 1 is implemented as a wrist-worn device having a housing 102 and a band 104. The band 104 is configured to wrap around a wrist of a user to secure the device in place on the user's body. The band 104 is coupled to the housing 102 to permit the housing 102 to be worn on the user's body together with the band 104.

With reference to FIG. 1, the housing 102 provides a structure that serves to enclose and support one or more internal components of the watch, such as, for example, one or more integrated circuit chips, circuit boards, display devices, batteries, memory devices, or other functional components. It is contemplated that the housing can in general be implemented as any suitable structure that serves to enclose functional and/or operative components of the device, such as a watch, and that can be directly or indirectly coupled to the band 104 to permit the housing to be worn on the user's body. Although shown in FIG. 1 with a generally rectangular structure providing a rectangular footprint, it is contemplated that the housing 102 can have any appropriate size or shape, such as round, hexagonal, square, or other shapes.

In some embodiments, for example as shown in FIG. 1, the housing 102 can provide main casing or casing assembly that provides an external structural framework of the watch 100 with which the user can directly interact. The housing 102 and each component of the housing 102 can have a front side 117 and a back side 119 opposite to the front side 117, which are oriented as generally shown by the dotted line in FIG. 1. As shown in FIG. 1, the housing 102 can include a perimeter sidewall 108 adjoining a front cover 116 and a back cover 118. The front cover 116 can be disposed on a front side 117 of the sidewall 108 and a front side 117 of the housing 102, while the back cover 118 can be disposed on a back side 119 of the sidewall 108 and the housing 102 that is opposite to the front side 117. Internal components can be disposed in an interior cavity between the front cover 116 and the back cover 118, while the sidewall 108 can extend peripherally or circumferentially around the interior cavity and internal components contained therein.

It is contemplated that the front cover 116, back cover 118, and sidewall 108 can each be made from discrete components or pieces that are attached or otherwise assembled together. Alternatively, it is contemplated that any two or more of the housing components can be integrally formed from a substantially monolithic structure to provide for the desired enclosure and/or support framework. It is also contemplated that any one of the front cover 116, the back cover 118, and the sidewall 108 can be made from multiple discrete pieces, layers, or other components that are attached or otherwise assembled together. In some embodiments, the housing 102 or any one or more parts of the housing 102 can be made from rigid materials. Examples of rigid materials that can be utilized for the housing 102 include glass, ceramics, crystalline materials such as sapphire, aluminum, steel, and/or plastics.

In some embodiments, for example as shown in FIG. 1, one or more external functional components such as input/output (I/O) devices can be supported by or coupled to the housing 102 to allow for manipulation by or other interaction with a user. As used herein, "I/O device" refers to any user interface device configured to receive input from a user and/or provide output to a user. "Input device" as used herein refers to any user interface device configured to receive input from a user and which may or may not be configured to provide output. "Output device" as used herein refers to any user interface device configured to provide output to a user and which may or may not be configured to receive input. For example, the watch 100 can include one or more buttons 114 disposed externally on or as part of the housing 102. The buttons 114 can, for example, be implemented as mechanical push buttons or touch-sensitive buttons. Additionally or alternatively, the watch 100 can include a rotatable dial 112 disposed externally on the housing 102. The rotatable dial 112 can be disposed rotatably with respect to the sidewall 108, and configured to provide for scrolling, sliding, or user interface (UI) navigation inputs. The dial 112 can be implemented as a digital crown in which mechanical rotation of the dial 112 provides for electronic input functionality to the watch 100. The button 114 and dial 112 are examples of I/O devices configured to interact with a user, and more particularly, are examples of input devices configured to receive input from a user for providing one or more functional inputs to the watch 100. It is contemplated that the I/O devices disposed on or supported by the housing can be positioned on the sidewall 108, as shown in FIG. 1, or positioned in any other suitable location on the housing.

With respect to the example shown in FIG. 1 and the frame of reference of a watch or wrist-worn device, the back cover 118 and back side 119 correspond to a side of the housing 102 and the watch 100 that faces a wrist of the user when the watch 100 is worn on the wrist. More generally, the back cover 118 and the back side 119 can face a body part of the user when the wearable device is worn on the body part. The front cover 116 and front side 117 correspond to a side of the housing 102 and the watch that face away from the wrist of the user. More generally, the front cover 116 and the front side 117 can face away from a body part of a user when the wearable device is worn on the body part. A display can be provided to present images or output various graphical information on or through the front side 117 of the housing 102 and through the front cover 116. In some embodiments, the front cover 116 can provide an input surface for a touch-sensitive device included in or overlapping with the display, such as a touch screen interface, force sensing device, and/or a fingerprint sensor. The input surface can, for example, permit a user to interact with graphical user interface (GUI) elements presented on the display. It is also contemplated that other wrist-worn devices can omit a display. Additionally or alternatively, it is contemplated that other I/O devices can be included, such as speakers, microphones, gesture interfaces, motion sensors, and the like.

The band 104 shown in FIG. 1 is implemented as a wristband that includes a first band strap 120 and a second band strap 122. The first band strap 120 and the second band strap 122 can connect to each other through a connector 124 that may, for example, be implemented as a clasp, a buckle, a magnetic attachment, or any other suitable mechanism for adjoining the first band strap 120 to the second band strap 122. Each of the first band strap 120 and the second band strap 122 can be made from any suitable flexible and/or rigid components that can generally conform to the outer surface of a user's wrist. Examples include, without limitation, leather, fabrics, rubber, nylon, plastics, and metallic bracelets. It is contemplated that the band 104 can be implemented in numerous different configurations and can generally include any suitable flexible or rigid components that can be removably wrapped around a wrist of a user. For example, in some embodiments the band 104 can omit the connector 124, such as an implementation having a single continuous watch band loop that is expandable to permit the expanded band 104 to be slid around a user's hand. Additionally or alternatively, the band 104 can include a sleeve or envelope that overlaps with the housing 102 in whole or in part to couple to the band 104 to the housing and hold the housing 102 in place on the user's wrist. Various other configurations are possible. Likewise, while the band 104 is implemented as a wristband, it will be appreciated that the teachings of the watch band can be applied to other bands that are configured to wrap around other body parts of a user.

The attachment interface 106 shown in FIG. 1 includes multiple attachment points, and in particular, includes an attachment point on one edge of the housing 102 and another attachment point on an opposing edge of the housing 102 to connect the first band strap 120 to the housing 102 and the second band strap 122 to the housing 102, respectively. The attachment interface 106 can include, for example, a slot, a lug, a threaded fastener, or any other suitable component to connect the band 104 to the housing 102. In some embodiments, the attachment interface 106 can provide for a latch, button, magnetic coupling, and/or other mechanism that releasably attaches the band 104 to the housing 102 to permit a user to easily remove the housing 102 from and reattach the housing 102 to the band 104 without a need for special tools. Although multiple attachment points are shown in FIG. 1, it is contemplated that other implementations can utilize more attachment points or a single attachment point for connecting the band 104 to the housing 102. Although the attachment interface 106 is shown disposed on the sidewall 108 in FIG. 1, it is contemplated that the attachment interface 106 can be disposed on or coupled to any other feasible location on the housing 102.

Figure 2:
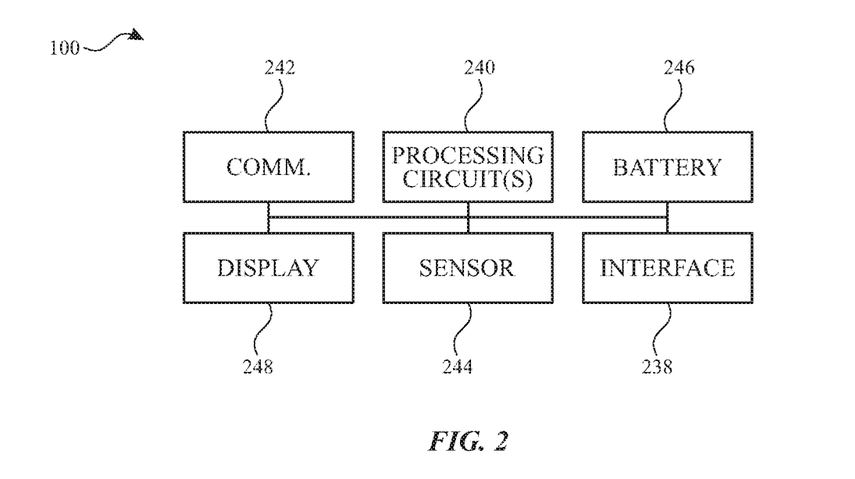
FIG. 2 is a block diagram of a watch, in accordance with some embodiments.

FIG. 2 shows a block diagram of watch 100 showing various functional components that may, for example, be housed within the housing 102. The watch 100 can further include one or more other user interfaces 238 for receiving input from and/or providing output to a user. For example, one or more buttons, dials, crowns, switches, or other devices can be provided for receiving input from a user. The user interface 238 can include a speaker, a microphone, and/or a haptic device. A haptic device can be implemented as any suitable device configured to provide force feedback, vibratory feedback, tactile sensations, and the like. For example, in one embodiment, the haptic device may be implemented as a linear actuator configured to provide a punctuated haptic feedback, such as a tap or a knock.

As further shown in FIG. 2, the watch 100 includes one or more processing circuit(s) 240 (referred to generally herein as processing circuitry) that is/are configured to perform one or more functions for the watch 100. By way of example, the processing circuitry can include one or more microprocessors, microcontrollers, field programmable gate arrays (FPGAs), application-specific integrated circuits (ASICs) such as I/O controller ICs, central processing units (CPUs), graphics processing units (GPUs), digital signal processors (DSPs), discrete circuit elements, and/or other suitably configured electronic circuitry or computing elements. In particular embodiments, the processing circuitry 240 can include, for example, one or more light emitting diode (LED) drivers, image sensor controllers, readout integrated circuits (ROIC), display driver ICs, host processors, and/or other suitable configured circuitry configured to control, process signals from, or otherwise cooperate with one or more I/O devices or I/O device controllers.

The processing circuitry can include or be configured to access a memory having instructions stored thereon. The instructions or computer programs may be configured to perform one or more of the operations or functions described with respect to the watch 100. The processing circuitry 240 can be implemented as an electronic device capable of processing, receiving, or transmitting data, signals, or instructions. As described herein, the term "processing circuitry" is meant to encompass a single processor or processing unit, a single integrated circuit, multiple processors, multiple integrated circuits, multiple processing units, or other suitably configured computing element or elements. The memory can store electronic data that can be used by the watch 100. For example, a memory can store electrical data or content such as, for example, audio and video files, documents and applications, device settings and user preferences, timing and control signals or data for the various modules, data structures or databases, and so on. The memory can be configured as any type of memory. By way of example only, the memory can be implemented as random access memory, read-only memory, Flash memory, removable memory, or other types of storage elements, or combinations of such devices.

As further shown in FIG. 2, the watch 100 may include a communication component 242 that facilitates transmission of data and/or power to or from other electronic devices across standardized or proprietary protocols. For example, a communication component 242 can transmit electronic signals via a wireless and/or wired network connection. Examples of wireless and wired network connections include, but are not limited to, cellular, Wi-Fi, Bluetooth, infrared, RFID and Ethernet.

As further shown in FIG. 2, the watch 100 may also include one or more sensors 244, such as biosensors or physiological sensors, positioned substantially anywhere on the watch 100. The one or more sensors 244 may be configured to sense substantially any type of characteristic such as, but not limited to, images, pressure, light, touch, force, temperature, position, motion, and so on. For example, the sensor(s) 244 may be a photodetector, a temperature sensor, a light or optical sensor, an atmospheric pressure sensor, a humidity sensor, a magnet, a gyroscope, an accelerometer, and so on. In some examples, the watch 100 may include one or more health sensors. In some examples, the health sensors can be disposed on or configured to sense through a bottom surface of the watch 100, such as on or near the back cover 118. The one or more sensors 244 can include optical and/or electronic biometric sensors that may be used to compute one or more physiological characteristics. A sensor 244 can include a light source and a photodetector to form a photoplethysmography (PPG) sensor. Light can be transmitted from the sensor 244, to the user, and back to the sensor 244. For example, the back cover 118 or other part of the housing 102 can provide one or more windows (e.g., opening, transmission medium, and/or lens) to transmit light to and/or from the sensor 244. The optical (e.g., PPG) sensor or sensors may be used to compute various physiological characteristics including, without limitation, a heart rate, a respiration rate, blood oxygenation level, a blood volume estimate, blood pressure, or a combination thereof. One or more of the sensors 244 may also be configured to perform an electrical measurement using one or more electrodes. Additionally or alternatively, a sensor 244 can be configured to measure body temperature, exposure to UV radiation, and other health-related information.

As further shown in FIG. 2, the watch 100 may include a battery 246 that is used to store and provide power to the other components of the watch 100. The battery 246 may be a rechargeable power supply that is configured to provide power to the watch 100. The watch 100 may also be configured to recharge the battery 246 using a wireless charging system using, for example, an electromagnetic device such as an inductive charging coil.

As further shown in FIG. 2, the watch 100 can include a display 248. The display can include, for example, a liquid crystal display (LCD) panel, an organic light-emitting diode (OLED), a microLED panel, projector device, or any other suitable electronic display technology or display panel. In some embodiments, the display 248 can be configured to present information relating to other components of the watch 100 as images, video, text, or other graphical information. For example, the display 248 can be configured to present an ECG graph, GSR information, a heart rate, or other information gathered with the sensor(s) 244. The various components shown in FIG. 2 can be coupled together or to the processing circuitry 240 via one or more busses, wireless communication links, or other interconnection technologies.

Figure 3:
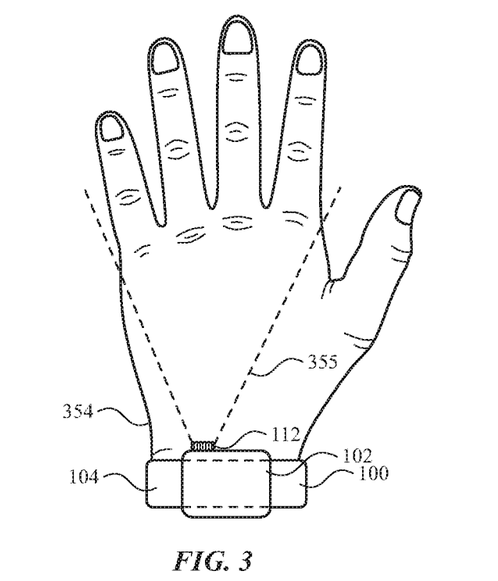
FIG. 3 is an illustration of a watch worn on a user's wrist, in accordance with some embodiments.

FIG. 3 shows an example of a usage of a watch 100 having a camera, in accordance with some embodiments. FIG. 3 shows an example of the watch 100 as it is worn on a user's wrist 354. In the example shown in FIG. 3, the watch 100 includes a rotatable dial 112 and camera integrated in or otherwise disposed on the dial 112. The band 104 is wrapped around the user's wrist 354 to secure the watch 100 including the housing 102 in place on the user's body.

As shown in FIG. 3, the watch 100 can be worn so that the dial 112 points in a general direction towards the user's hand and towards the user's fingers, and away from the user's forearm and away from the user's upper arm (not visible in FIG. 3). This is a natural orientation for users to use when wearing a watch with a crown, as it permits the user to more easily rotate or otherwise interact with the crown using their other free hand (not visible in FIG. 3) without having to cross over the main display or body of the watch 100 with their free hand.

According to some embodiments, for example as shown in FIG. 3, the watch 100 can include a camera integrated with or otherwise disposed on the dial 112 and having a field of view (FOV) 355 extending in the same direction in which the dial 112 points. In particular, and as shown in FIG. 3, the FOV 355 of the camera in the example shown in FIG. 3 points in a general direction towards the user's hand and fingers of the arm wearing the watch 100, and away from the user's forearm and upper arm of the arm wearing the watch 100. This can permit the user to capture pictures with the camera while the watch 100, including housing 102 and band 104 remains worn to the user's wrist 354. For example, the user may be able to simply point their hand wearing the watch 100 and point the dial 112 towards the scene which they desire to capture with the camera. Alternatively, the user may be able to remove the watch 100 and/or watch housing 102 to take a picture, if desired.

Figure 4:
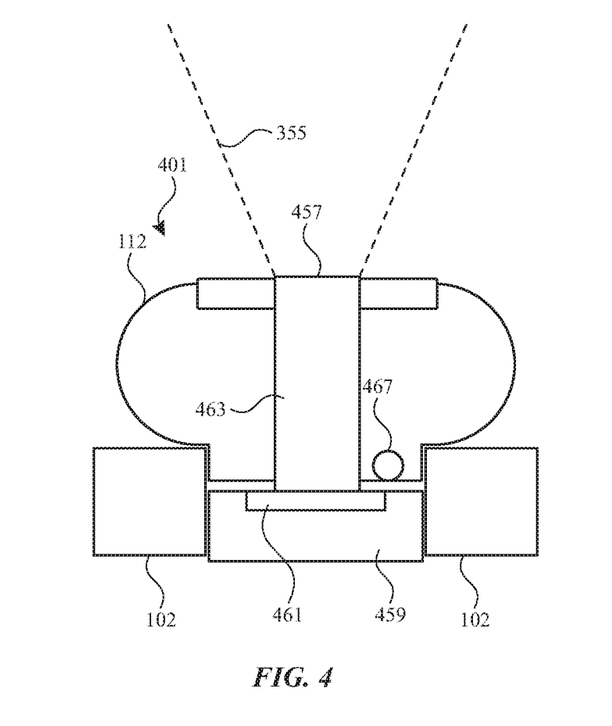
FIG. 4 is a cross section view of an assembly for a watch, in accordance with some embodiments.
Figure 5:
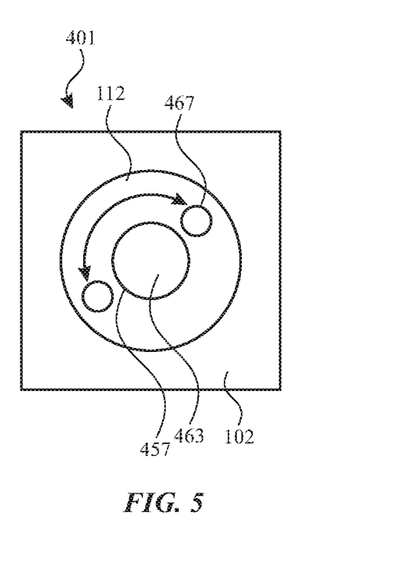
FIG. 5 is a plan view of the assembly from FIG. 4.

FIGS. 4 and 5 show an example of an assembly 401, such as a watch crown assembly, containing a camera integrated with the rotatable dial 112, in accordance with some embodiments. FIG. 4 shows a cross section view of the assembly 401, while FIG. 5 shows the assembly in plan view.

As shown in FIG. 4, the assembly 401 can include a rotatable dial 112 containing an aperture 457. The aperture 457 can include any suitable hole or optical opening that permits light in the wavelengths of interest to propagate through the aperture 457 and be incident on light-sensitive components of the camera. For example, the aperture 457 can include an air gap, transparent solid material or materials, and/or a lens or other optical element disposed therein.

With continued reference to the example shown in FIG. 4, the camera can include an image sensor 459 that can be disposed behind the aperture 457 so that all or a portion of the aperture is positioned between the image sensor 459 and the FOV 355 of the image sensor 459 and camera. In this configuration, the image sensor 459 can be disposed on one side of the dial 112 and can be configured to view a scene on an opposite side of the dial 112. The image sensor 459 can include, for example, an active photosensitive area having a photodetector array 461. The photodetector array 461 can, for example, be aligned with the aperture 457 to permit light propagating through the aperture 457 to be incident onto the photodetector array 461, although any other arrangement is feasible that permits an optical path to be formed through the aperture 457 and to the photodetector array 461.

The photodetector array 461 can include, for example, a plurality of photodiodes, phototransistors, and/or any other suitable plurality light sensitive elements. The light sensitive elements can, for example, be arranged in a regular two-dimensional array of pixels that provides for sufficient resolution for capturing a scene or other information of interest. By way of example, photodetector array 461 can include 1 or more megapixels (MP), such as an array having approximately 1 MP, 2 MP, 3 MP, 4 MP, 5 MP, 6 MP, 7 MP, 8 MP, 10 MP, 12 MP, 16 MP, or more. It is contemplated other resolutions and/or pixels densities can be utilized, and the arrangement of the photodetector array 461 can be selected based on considerations such as the desired image resolution, power consumption, and/or information of interest to be captured. The image sensor can be implemented in a silicon die, thin-film transistor substrate, integrated circuit (IC), and/or other suitable electronic component capable of provide active electronic circuitry and/or light sensitive elements that can optically capturing an image. In some embodiments, the photodetector array 461 can be sensitive to and be configured to capture a full spectrum of visible light to allow for a user to capture images that provide still pictures (photographs) and/or moving pictures (videos) that can substantially replicate the scene as they view them through their human eyes. Additionally or alternatively, the image sensor 459 can be configured to capture any desired wavelength(s) of light in the visible and/or non-visible spectrum (such as infrared and/or ultraviolet wavelengths). For example, invisible light can be captured to provide for object recognition (such as facial recognition), depth sensing capabilities, thermal imaging, and/or other purposes.

With continued reference to the example shown in FIG. 4, the camera can include a lens 463, which can be disposed within the aperture 457. Additionally or alternatively, other implementations are contemplated in which the lens 463 or a portion of the lens is disposed below behind the aperture 457 and in front of the image sensor 459, between the image sensor 459 and the aperture 457 and dial 112. The lens 463 provides an optical element that can be configured to focus an image of a scene from within the FOV 355 of the camera onto the image sensor 459, e.g., onto an image plane defined by the photodetector array 461. The lens 463 can include, for example, a single layer or multiple refractive layers that singly or collectively act on the light to provide to focus the image.

It is contemplated that any one or more components of the camera, such as the lens 463 and image sensor 459 can be disposed to rotate together with the dial 112 and/or be fixed relative to the housing 102. According to some embodiments, the image sensor 459 can be fixed relative to the housing 102. For example the image sensor 459 can be mounted directly to the housing 102 or indirectly via one or more substrates, frames, brackets, or other mounting components that are fixed to the housing 102.

With reference to FIGS. 4 and 5, the fixed image sensor 459 can be configured to detect a rotation of the dial 112 with respect to the housing 102 and with respect to the image sensor 459. To facilitate optical detection of the rotation of the dial 112, the dial 112 can include a marking 467 to facilitate detection of rotation in either or both circumferential directions shown by the arrows in FIG. 5. The marking 467 can include, for example, any visible ink, surface texture, or other non-uniformity on the dial 112 or on a surface of the dial 112 that is within a view of the image sensor 459 so that the image sensor 459 can optically sense movement of the marking 467. As shown in FIGS. 4 and 5, the marking 467 can be disposed on the dial 112 in an outer region or area outside of the aperture 457 to permit the marking 467 to rotate around the aperture 457, which can be disposed in an inner area or region at or near the center of the dial 112.

The marking 467 can permit the image sensor 459, or processing circuitry 240 that can be communicatively coupled directly or indirectly to the image sensor 459, to discriminate a relative and/or absolute rotation of the dial 112 based on pattern recognition or other signal processing with respect to the marking 467 in images or other optical information captured with the sensor. This can, for example, allow the image sensor 459 to provide multi-purpose functionality in which it both captures pictures of scenes through the dial 112 for remote image sensing, and detects the rotation of the dial 112 to provide for control inputs or other user inputs that can be used to interact with a user interface of the device. For example, the inputs to the dial 112 captured by the image sensor 459 can be used for graphical user interface (GUI) scrolling inputs, selection inputs, panning, or other manipulations of a graphic presented on the display 248. This can allow for the image sensor 459 of the camera to provide functionality that avoids a need for a separate sensor or device to detect the dial 112 rotation for providing input functionality. In some embodiments, the image sensor 459 can be configured to operate in distinct modes of operation to detect the rotation and to capture the image. For example, the image sensor 459 can be configured to operate in a low power mode of operation to detect the rotation of the dial, as detailed image capture or high resolution pictures may not be required in the rotational input sensing mode for tracking or otherwise detecting movement of the dial. The low power mode may have lower power consumption than the picture capture mode by, for example, capturing a lower resolution image or data, having a lower duty cycle, or through other techniques.

Figure 6:
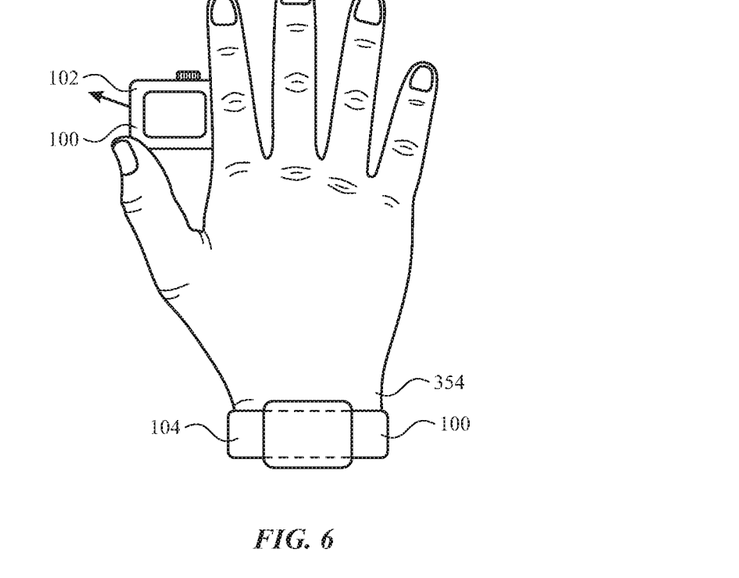
FIG. 6 is an illustration of a watch housing held by a user's hand to take a picture, in accordance with some embodiments.

FIG. 6 shows another example of a usage of a watch 100 having a camera, in accordance with some embodiments. FIG. 6 shows an example of the watch 100 with a band 104 as it is worn on a user's wrist 354, and with the housing 102 removed or detached from the band 104 during a capture of a picture. In the example shown in FIG. 6, the watch 100 includes a camera mounted directly or indirectly to the housing 102 and configured to capture a picture of a scene through the back side 119 of the housing 102. A display can be visible through the front side 117 of the housing 102 to permit the captured picture to be displayed during or after the picture is captured with the camera. A release mechanism in the attachment interface 106, such as described previously, can provide a convenient mechanism for removing the watch housing 102 from the band 104 to take a picture with a back facing camera on the watch housing, although other implementations are contemplated in which the watch housing 102 can be removed from the wrist 354 together with the band 104 to take the picture.

Figure 7:
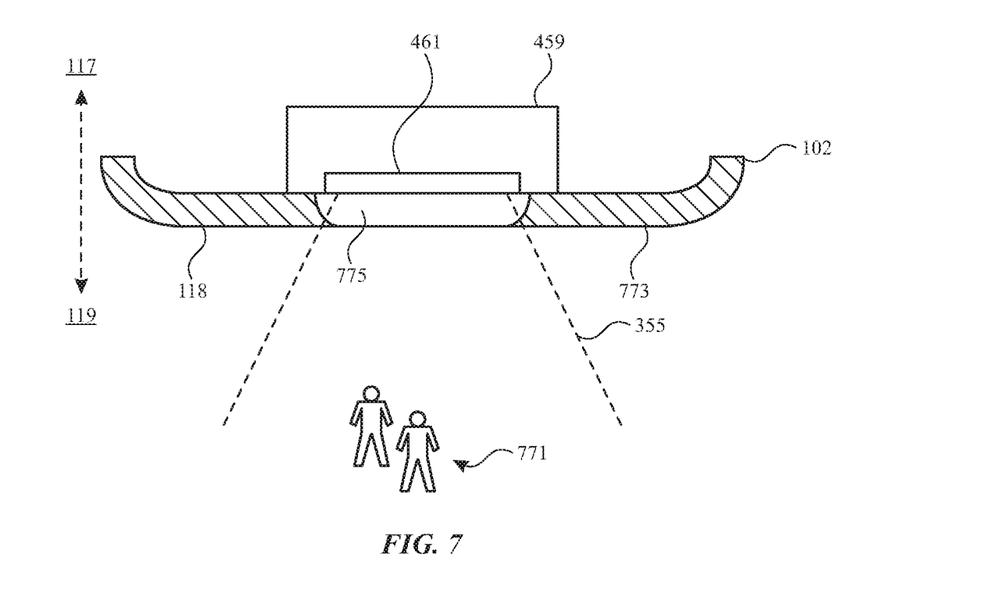
FIG. 7 is a cross section view of a watch having a back-facing camera, in accordance with some embodiments.

FIG. 7 shows the example from FIG. 6 in a cross section view. The image sensor 459 of the camera is disposed behind the back cover 118 of the housing 102 relative to a FOV 355 of the camera and the scene 771 to be captured. In particular, the back cover 118 is disposed between the image sensor 459 and the scene 771 viewed by the image sensor 459 and the camera. A lens of the camera configured to focus an image onto the image sensor 459 can, for example, be integrated within the back cover 118. Additionally or alternatively, all or a portion of the lens can be disposed between the image sensor 459 and the back cover 118. In some embodiments for example as shown in FIG. 7, the back cover 118 can include an opaque region 773 disposed in an area beside and/or around the image sensor 459, and an optical window 775 aligned with the photodetector array 461 or otherwise aligned with the active area of the image sensor 459.

Figure 8:
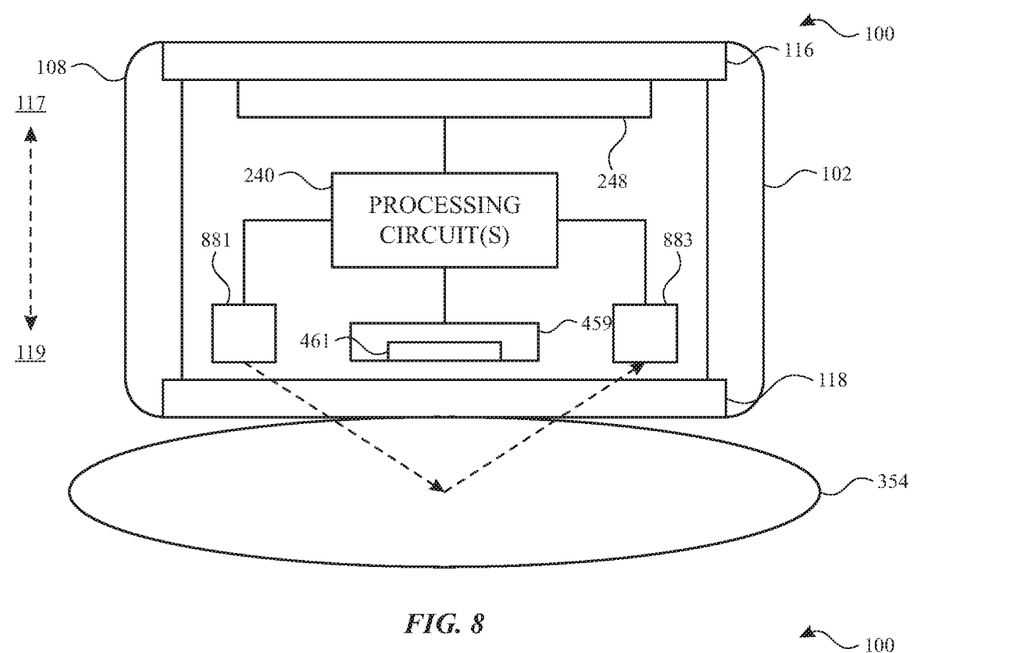
FIG. 8 is a cross section view of a watch having a back-facing camera and a physiological sensor when worn on a user's wrist, in accordance with some embodiments.
Figure 9:
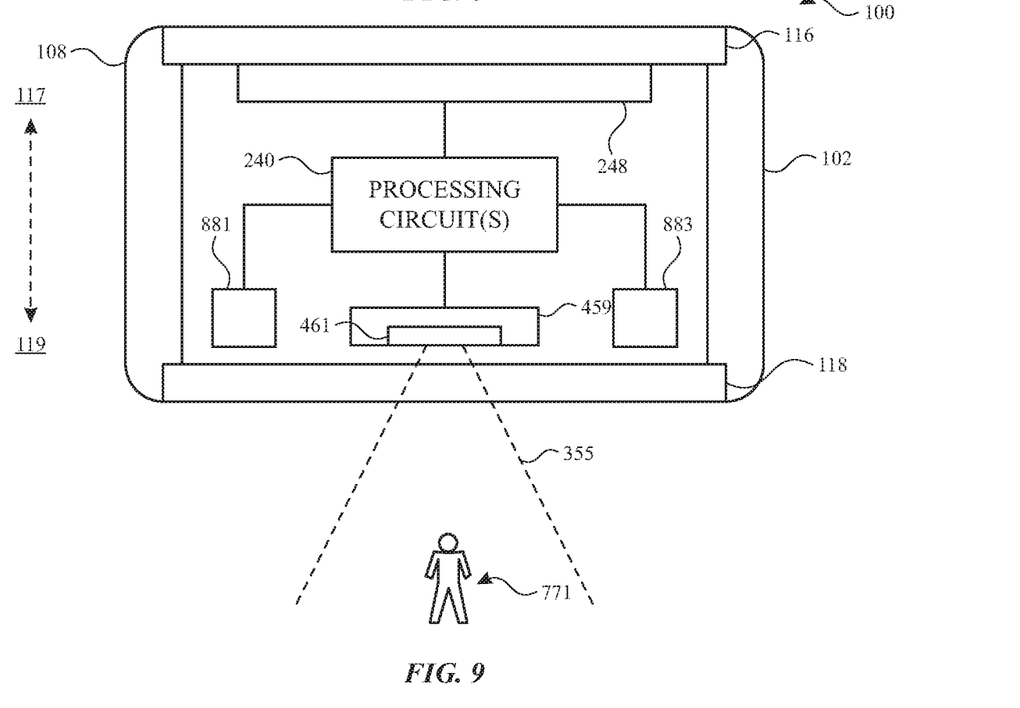
FIG. 9 is a cross section view of the watch from FIG. 8 during scene capture, in accordance with some embodiments.

FIGS. 8 and 9 show an example of a watch 100 in which a camera is mounted to capture a picture of a scene through a back side 119 of a watch housing 102, and in particular, through a back cover 118. Another optical device having a light emitter 881 and light detector 883 is included to also detect light through the back cover in addition to the image sensor 459 of the camera. It is contemplated that the light emitter 881 and detector 883 can be positioned in any suitable location. In FIGS. 8 and 9, the light emitter 881 and detector 883 are positioned in an area beside the image sensor 459, e.g., in a plane above, below, or in the same plane as the image sensor 459. The other optical device can be, for example, a physiological sensor such as a PPG sensor and/or heart rate monitor configured to illuminate the wrist 354 for physiological sensing when the watch 100, including the housing 102, is worn on the user's wrist 354. As shown for example in FIGS. 8 and 9, the other optical device can be configured to sense or otherwise interact with the user's wrist 354 when the watch housing 102 is worn on the user's wrist, and the image sensor 459 can be configured to capture a picture of a scene 771 when the housing 102 is removed or not worn on the user's wrist.

The light emitter 881 can include, for example, a light emitting diode (LED) or other appropriate electronic device capable of emitting light. The light detector 883 can include, for example, a photodiode (LED) or other appropriate light sensitive element capable of detecting light. Although one light emitter 881 and one light detector 883 is shown in the figures, the optical device can in general include any suitable number of one or more light emitters and one or more light detectors capable of detecting a response signal, such as detecting reflected light that is emitted by the light emitter and reflected off of the user's wrist. According to some embodiments, for example, two or more light emitters that emit light two or more different spectral bands of light, such as a one or more green LEDs and one or more IR LEDs, or any other appropriate combination, can be used to illuminate the wrist for a pulse oximetry to detect a response that varies based on the presence or absence of oxygenated blood in the user's wrist and that can be used to determine a heart rate. Additionally or alternatively, two or more light detectors that detect two or more different spectral bands of light, such as a one or more green photodiodes and one or more IR photodiodes. In various embodiments, the spectral properties of optical components such as the light emitter 881 and/or light detector 883 can be tuned, for example, using color filters or based on electrical characteristics of the light emitter/detector.

Figure 10:
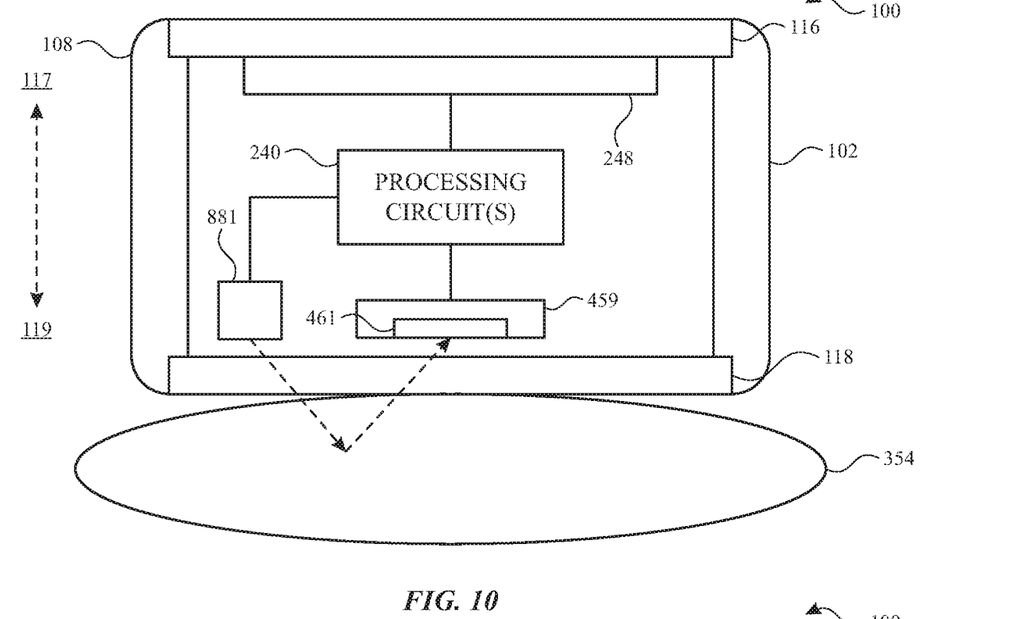
FIG. 10 is a cross section view of a watch having an image sensor configured to capture pictures and detect a physiological signal, in accordance with some embodiments.
Figure 11:
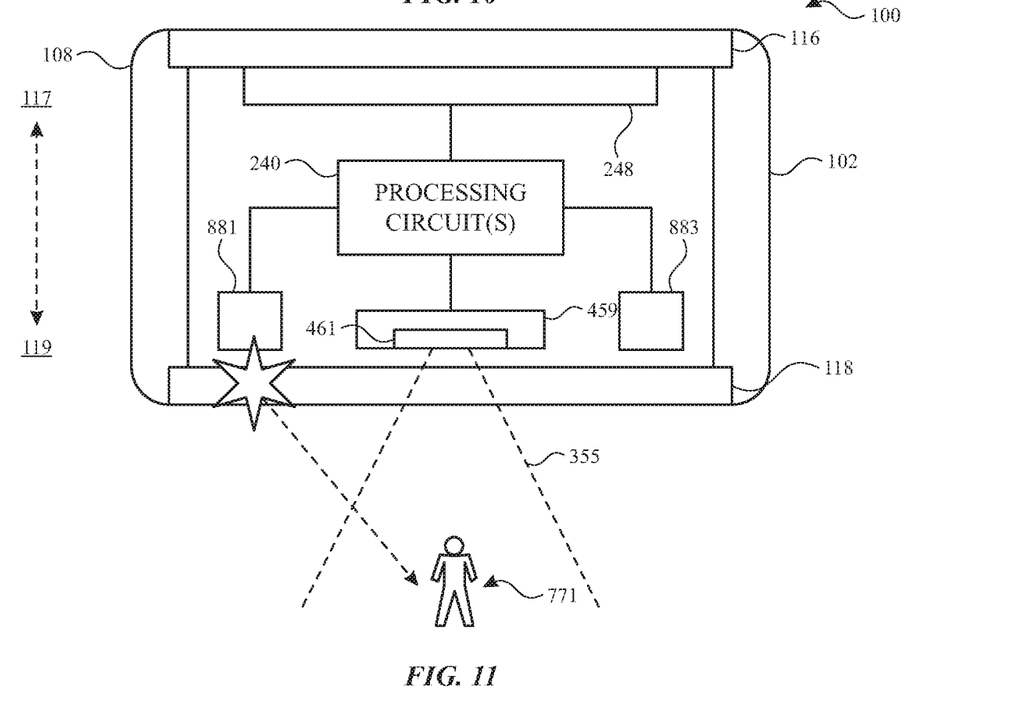
FIG. 11 is a cross section view of a watch having light emitter configure to illuminate a scene for picture capture and illuminate a wrist for physiological sensing, in accordance with some embodiments.

In some embodiments, for example as shown in FIGS. 10 and 11, one or more components of the camera and/or the other optical device can be dual purposed or otherwise multi-purposed to implement functionality with both applications. For example, one or more components of the camera such as the image sensor and/or a camera flash can be configured for both remote sensing to capture a picture of a scene when the housing is removed from the user's wrist, and for contact sensing to capture a PPG or other physiological signal when the housing is in contact with or otherwise worn on the user's body.

Referring to the example shown in FIG. 10, the image sensor 459 can be configured to optically detect a PPG or other reflectance signal from the user's wrist 354 when the housing is on the user's wrist 354. As shown in FIG. 10, the light emitter 881 can illuminate the wrist 354 (e.g., as described above with reference to FIGS. 8 and 9), and the image sensor 459 can be configured to operate in a physiological sensing mode to detect the reflectance signal. The reflectance signal detected by the image sensor 459 can include a response to the emitted light used to illuminate the wrist 354 with the light emitter 881. In some embodiments, the image sensor 459 can be configured to operate in a low power mode of operation to detect the reflectance signal, as detailed image capture or high resolution pictures may not be required in the physiological sensing mode for heart rate monitoring or other purposes. The low power mode may have lower power consumption than the picture capture mode by, for example, capturing a lower resolution image or data, having a lower duty cycle, or through other techniques. Thus, the same sensor can be utilized for both picture capture or remote sensing, and physiological sensing or contact sensing, thereby avoiding a need for a separate dedicated detector component.

Referring to the example shown in FIG. 11, the watch 100 can additionally or alternatively be configured to utilize the light emitter 881 for both physiological sensing or contact sensing (e.g., reflectance based PPG sensing as described above), and as a camera flash to illuminate the scene 771 during picture capture. For example, the light emitter 881 can be configured to emit light in a first spectral band (e.g., a green light) to operate as an illuminator for PPG sensing when the housing 102 is worn on the wrist 354, and then configured to emit light in a second spectral band (e.g., white light) to operate as a camera flash for scene capture. Since both a PPG sensor and a camera flash may utilize a Fresnel lens or similar optical element over the light emitter, utilizing the light emitter for both purposes may provide a convenient solution in which a need for a separate light emitter is avoided.

It is contemplated that the examples shown in FIGS. 10 and 11 may further be combined in some embodiments. For example, in some embodiments, the watch 100 can include an image sensor and a light emitter, where the image sensor is configured to operate as described above with respect to FIG. 10 and the light emitter is configured to operate as described above with respect to FIG. 11, thus avoiding a need entirely for any dedicated sensor for heart rate monitoring or other physiological sensing.

Figure 12:
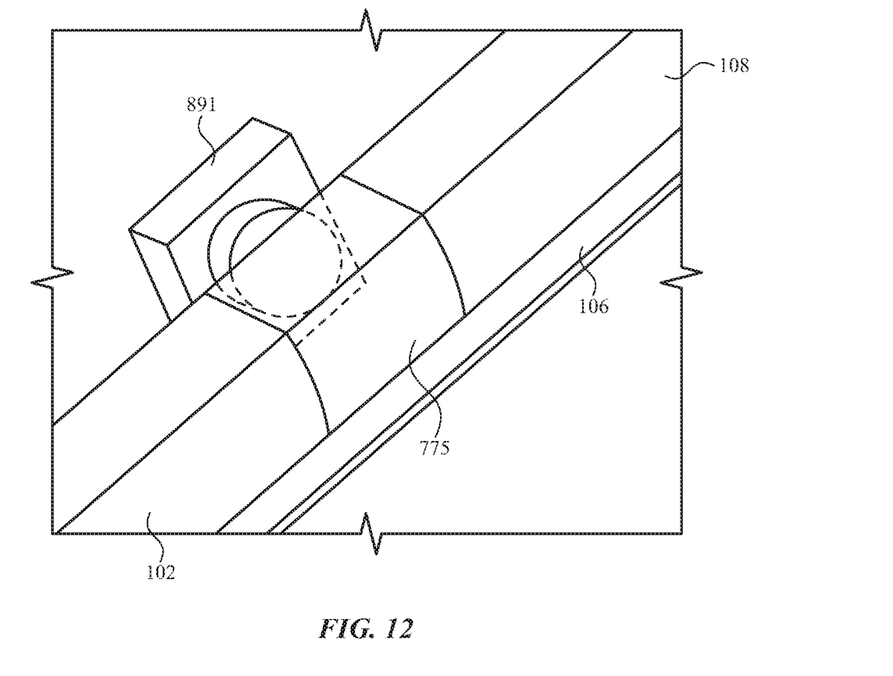
FIG. 12 is a perspective view of a watch having a camera window integrated with a watch band attachment interface, in accordance with some embodiments.
Figure 13:
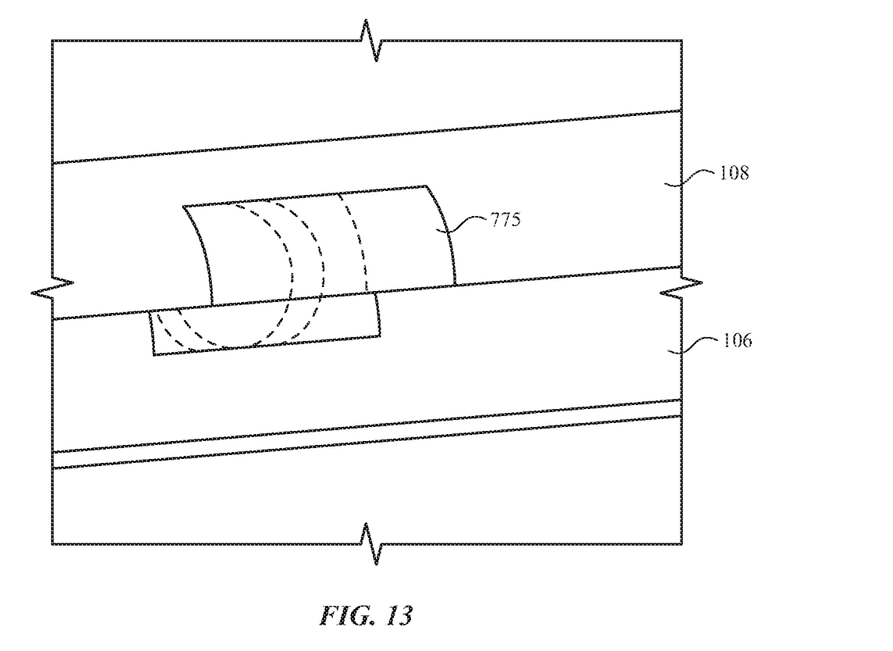
FIG. 13 is another view of the watch from FIG. 12, in accordance with some embodiments.

Referring now to FIGS. 12 and 13, an example of a watch 100 having a camera is shown, in accordance with some embodiments. As shown in FIGS. 12 and 13, the watch 100 can include a camera integrated with an attachment interface 106, such as a slot or channel configured to releasably accommodate an end of a watch band strap. An image sensor can be disposed within the housing 102, in an interior space of the housing 102, as part of an image sensor assembly 891. In some embodiments, the image sensor assembly 891 can include substrates, frames, or other components configured to facilitate mounting of the images sensor directly or indirectly to the housing 102 within an interior space of the housing 102. In some embodiments, the image sensor assembly 891 can include a lens disposed between the housing sidewall 108 and the image sensor, which can be configured to focus an image of a scene onto the image sensor as described above. Additionally or alternatively, an integrated lens component can be provided in an optical window 775 provided in the sidewall 108 of the housing in the region of the attachment interface 106, and through which the image sensor can be configured to capture the image.

The optical window 775 can include, for example, solid transparent material that provides an aperture for image capture through what can be an otherwise opaque housing sidewall 108 or attachment region. The solid transparent material may, for example, be formed using a two-shot insert or co-molding process. As the attachment region may include thicker sidewall portions, a structural integrity and water seal may be maintained through the optical window included in the attachment interface 106.

Figure 14:
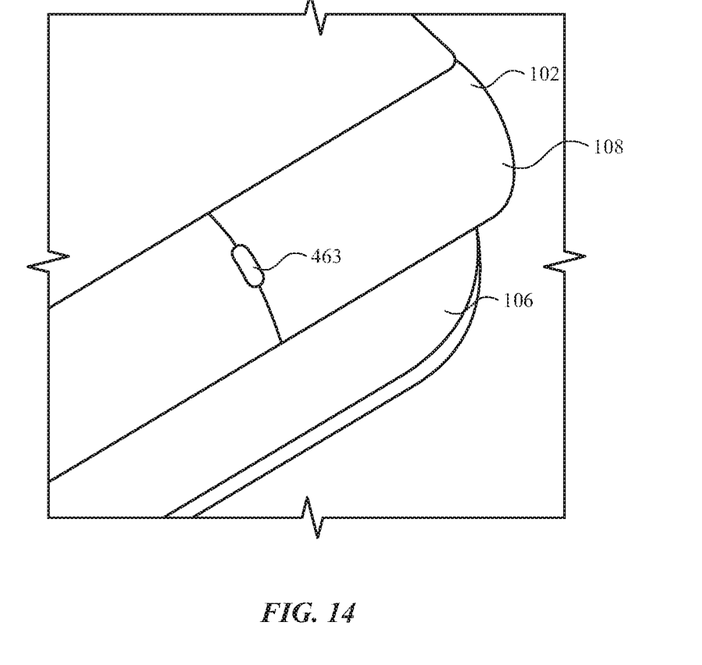
FIG. 14 is a perspective view of a watch having a lens component integrated with a housing, in accordance with some embodiments.
Figure 15:
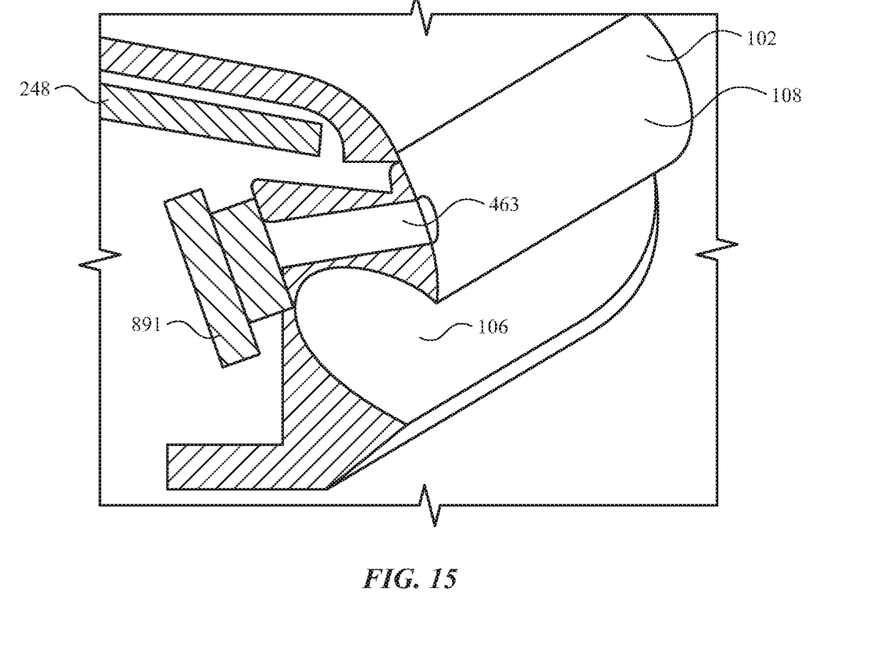
FIG. 15 is a cut away view of the watch from FIG. 14.

Referring now to FIGS. 14 and 15, another example of a watch 100 having a camera is shown, in accordance with some embodiments. FIG. 14 is a perspective view of the watch 100, while FIG. 15 is a cutaway view of the watch 100 from FIG. 14 showing internal components, such as an image sensor assembly 891 and a display panel 248 that can be disposed within an interior cavity of the housing 102. As shown in FIGS. 14 and 15, for example, a lens 463 can be integrated with the housing. The lens 463 can be integrated into a portion of the sidewall 108 so as to form a flush surface and/or to extend through an entire thickness of the sidewall 108. This may, for example, provide or allow for a housing with sufficient structural integrity and a water seal that can prevent or mitigate against water ingress into the interior cavity of the housing. The lens 463 can, for example, be integrated along an edge of the housing 102 that also includes band attachment interface 106, or in any other location on the housing 102. Although a lens is described, other implementations are contemplated in which the lens 463 shown in FIG. 15 is instead implemented as a light pipe or other aperture extending through the thickness of the sidewall 108, in which case a lens for focusing the image onto the image sensor can be included between the image sensor assembly 891 and the sidewall 108.

As described above, one aspect of the present technology is the gathering and use of data available from various sources to provide improved health-related or body monitoring functionality. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to diagnose health conditions. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of diagnostic services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, physiological monitoring can be utilized based on non-personal information data or a bare minimum amount of personal information, such as the content being requested by the device associated with a user, other non-personal information available to the device, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A watch comprising:
   a housing having a front side, a back side opposite the front side, and an attachment interface configured to couple to a watch band;
   a camera mounted to the housing and configured to capture a picture of a scene through the back side of the housing; and
   a display visible through the front side of the housing and configured to display the picture.

2. The watch of claim 1, further comprising:
   a light emitter configured to illuminate the scene when the housing is removed from a wrist and illuminate the wrist for physiological sensing when the housing is worn on the wrist.

3. The watch of claim 2, wherein the light emitter is configured to illuminate the scene with a first spectral band of light in connection with the capture of the picture and illuminate the wrist with a second spectral band of light different from the first spectral band in connection with the physiological sensing.

4. The watch of claim 1, further comprising:
   a light emitter configured to illuminate a wrist when the housing is worn on the wrist;
   wherein the camera comprises an image sensor and a lens configured to focus an image of the scene onto the image sensor when the housing is removed from the wrist; and
   wherein the image sensor is configured to detect reflected light from the wrist for physiological sensing when the housing is worn on the wrist.

5. The watch of claim 4, wherein the image sensor is configured to operate in a first power mode to capture the picture and operate in a second power mode having lower power consumption than the first power mode to detect the reflected light for physiological sensing.

6. The watch of claim 1, wherein:
   the housing comprises a front cover disposed on the front side and a back cover disposed on the back side;
   the display is configured to display the picture through the front cover; and
   the camera is configured capture the picture through the back cover.

7. The watch of claim 6, further comprising:
   a physiological sensor disposed in an area beside the camera;
   wherein the physiological sensor is configured to obtain a measurement of a wrist when the back cover is coupled to the wrist; and
   wherein the camera is configured to capture the picture when the back cover is removed from the wrist.

8. The watch of claim 7, wherein the physiological sensor includes an optical device configured to emit and detect light through the back cover.

9. An assembly for a watch, the assembly comprising:
   an image sensor; and
   a dial rotatable with respect to the image sensor, wherein the image sensor is configured to capture an image of a scene outside of the watch through an aperture of the dial and configured to detect a rotation of the dial with respect to the image sensor.

10. The assembly of claim 9, wherein the image sensor is disposed on a first side of the dial and the image sensor is configured to view a scene on a second side of the dial opposite to the first side.

11. The watch of claim 9, wherein the image sensor is configured to operate in a first power mode to capture the image and operate in a second power mode having lower power consumption than the first power mode to detect the rotation.

12. The assembly of claim 9, wherein:
the dial includes a marking; and
the image sensor is configured to detect a rotation of the marking.

13. The assembly of claim 12, wherein:
the dial includes an outer region disposed around the aperture;
the marking is disposed in the outer region; and
the image sensor is configured to detect the rotation of the dial by optically sensing movement of the marking and capture the image through the dial by optically sensing a scene through the aperture.

14. The assembly of claim 13, further comprising a lens disposed in the aperture.

15. The assembly of claim 9, further comprising:
a housing, wherein the image sensor is fixed relative to the housing and the dial is mounted rotatably with respect to the housing.

16. The assembly of claim 15, wherein:
the housing has a front side, a back side opposite to the front side, and a sidewall adjoining the front side and the back side;
the dial is disposed on the sidewall; and
the assembly includes an electronic display configured to present a graphic through the front side and modify the graphic in response to the rotation detected by the image sensor.

17. The assembly of claim 16, wherein the electronic display is further configured to present the image captured by the image sensor.

18. A watch comprising:
a housing having an attachment interface, comprising a channel for releasably receiving an end of a watch band, wherein a portion of the channel is formed by a window; and
an image sensor disposed within the housing and configured to capture an image through the window.

19. The watch of claim 18, wherein the window includes an integrated lens.

20. The watch of claim 18, wherein the window comprises a solid transparent material forming a seal against a sidewall of the housing.

* * * * *